United States Patent [19]
Lacombe et al.

[11] Patent Number: 6,055,647
[45] Date of Patent: Apr. 25, 2000

[54] METHOD AND APPARATUS FOR DETERMINING COMPUTER SYSTEM POWER SUPPLY REDUNDANCY LEVEL

[75] Inventors: John S. Lacombe, Tomball; Jose A. Santin, Clear Lake Shores; Siamak Tavallaei, Spring, all of Tex.

[73] Assignee: Compaq Computer Corporation, Houston, Tex.

[21] Appl. No.: 08/912,184

[22] Filed: Aug. 15, 1997

[51] Int. Cl.[7] .................................................. G06F 11/00
[52] U.S. Cl. ............................................. 714/14; 714/47
[58] Field of Search ............................. 395/835, 182.12, 395/836, 837, 838, 839, 180, 181, 182.02, 182.04, 182.09, 182.2, 183.07, 183.13, 183.19, 183.2, 184.01, 750.08, 750.01, 750.07, 283; 307/65; 364/492; 714/1–6, 14, 25, 7, 8

[56] References Cited

U.S. PATENT DOCUMENTS

| | | | |
|---|---|---|---|
| 5,500,940 | 3/1996 | Skeie | 395/183.01 |
| 5,526,289 | 6/1996 | Dinh et al. | 364/557 |
| 5,574,667 | 11/1996 | Dinh et al. | 364/557 |
| 5,617,049 | 4/1997 | Hirano et al. | 327/172 |
| 5,627,965 | 5/1997 | Liddell et al. | 395/185.01 |
| 5,631,800 | 5/1997 | Jin et al. | 361/103 |
| 5,634,038 | 5/1997 | Saitoh | 395/490 |
| 5,638,895 | 6/1997 | Dodson | 165/121 |
| 5,652,893 | 7/1997 | Ben-Meir et al. | 395/750 |
| 5,656,869 | 8/1997 | Gluskoter et al. | 307/64 |
| 5,664,089 | 9/1997 | Byers et al. | 395/182.12 |
| 5,694,283 | 12/1997 | Huczko | 361/93 |
| 5,708,771 | 1/1998 | Brant et al. | 395/182.2 |
| 5,774,315 | 6/1998 | Mussenden | 361/18 |
| 5,809,311 | 9/1998 | Jones | 395/750.01 |
| 5,834,856 | 11/1998 | Tavallaei | 307/64 |
| 5,835,780 | 11/1998 | Osaki et al. | 395/750.01 |
| 5,838,929 | 11/1998 | Tanikawa | 395/282 |
| 5,842,030 | 11/1998 | Larabell et al. | 395/750.08 |

FOREIGN PATENT DOCUMENTS

| | | |
|---|---|---|
| 2032662 | 10/1991 | Canada . |
| 194471 | 2/1986 | European Pat. Off. . |
| 352730 | 7/1989 | European Pat. Off. . |

OTHER PUBLICATIONS

The I$^2$C–Bus and how to use it (including specification); *Philips Semiconductor*; Apr. 1995; pp. 1/24.

"Remote 8–bit I/O expander for I$^2$C–Bus" Data Sheet; *Philips Semiconductor*; Apr. 2, 1997; pp. 1–23.

Farnsworth, C.; "Low Power Implementation of an I$^2$C–Bus Expander"; http://maveric0.uwaterloo.ca/amulet/publications/thesis farnsworth 94$\underline{0}$msc.html; Jun. 16, 1997; one page.

Collins, Andy; "Interfacing TMS370 Microcontrollers to I$^2$C–Bus ICs"; Logikos; wysiwyg://lll/http://www.logikos.com/tms370.html; Jun. 16, 1997; pp. 1–6.

"I$^2$C–Bus Expander" Application Note AN036; *Philips Semiconductors Programmable Logic Devices*; Oct., 1993; 22 pages.

"The PCI (Peripheral Component Interconnect) Bus"; Aug. 6, 1997; pci.txt at www.gl.umbc.edu; pp. 1–7.

(List continued on next page.)

*Primary Examiner*—Robert W. Beausoliel, Jr.
*Assistant Examiner*—Nadeem Iqbal
*Attorney, Agent, or Firm*—Jenkens & Gilchrist, a professional corporation

[57] ABSTRACT

Apparatus, and an associated method, for determining the level of power supply redundancy in a modular computer system. Determination of the level of power supply redundancy is made dynamically, during on-line operation of the computer system. Reconfiguration of the computer system, such as to increase the load which must be powered by modular power supply components, or removal or addition of power supply components to form portions of the computer system cause initiation of a new determination of the level of power supply redundancy. Indications of inadequate levels of power supply redundancy are provided to a user of the computer system so that corrective action can be taken.

18 Claims, 3 Drawing Sheets

OTHER PUBLICATIONS

Barton, Jim; "Re: What's the difference between locks and semaphores?"; (jmb@patton.wpd.sgi.com) Jan. 2, 1991; Accessed Jun. 16, 1997; http://www.sgi.com/Archive/comp.sys.sgi/1991/Jan/0006.html.

"Internal Data Structures, 6.4.3 Semaphores" Basic Concepts; Accessed Jul. 11, 1997; http://linux.www.db.erau.edu/LPG/node47.html.

"The PCI Local Bus"; Accessed Jul. 27,1 997; http://www.rns.com/whats new/wh pci.html.

"PCI Bus Technology" Information Brief; *IBM Personal Computing Solutions*; Accessed Jul. 27, 1997; http//www.us.pc.ibm.com/infobrf/ibpci.html.

"PCI164 Screamer Functional Diagram" Microway; Accessed Jul. 27, 1997; http://www.microway.com/block.html.

"The PCI (Peripheral Component Interconnect) Local Bus" description of PCI Bus; Accessed Jul. 27, 1997; http://www.sundance.com/pci.html.

"CMOS Bus Switches Provide Zero Delay Bus Communication" Application Note AN–09; *Quality Semiconductor Inc.*; date unknown; pp. 1–9.

"High–Performance CMOS Analog 8–Channel Switch" QS4A05Q Preliminary; *Quality Semiconductor Inc.*; May 30, 1996; pp. 1–7.

"Quickswitch® Converts TTL Logic to Hot Plug Operation" Application Note AN–13; *Quality Semiconductor Inc.*; date unknown; pp. 1–5.

Gatti, Control and monitoring of uninterruptible power systems, Telecommunications Energy Conference, pp. 7.3.1–7.3.4, Aug. 1989.

Tripathi et al., Analysis and design of a fast response three phase fixed frequency static power supply, Proceed. of the 1996 International conference, pp. 339–345, Jun. 1996.

Pietkiewicz et al., Redundant DC–DC switching power supply system for telecommunication equipment, Telecommunications Energy conference, Proceed. Intl., pp. 167–173, Aug. 1988.

Shi et al., Fault tolerant distributed power, APEC 1996 conference Proced. , pp. 671–677 vol. 2, Jun. 1996.

Schulze et al., How reliable is a Raid, 34 th. IEEE computer society Intl. Conference, pp. 118–123, Apr. 1989.

METHOD AND APPARATUS FOR DETERMINING COMPUTER SYSTEM POWER SUPPLY REDUNDANCY LEVEL

BACKGROUND OF THE INVENTION

1. Field of the Invention

The present invention relates generally to a computer system, such as a server system, having modular components. More particularly, the present invention relates to apparatus, and an associated method, for determining a power supply redundancy level of a set of modular power supplies which form a portion of the computer system.

The determination of the power supply redundancy level is made dynamically, during on-line operation of the computer system. If the computer system is reconfigured to alter the number of modular components of the system, and the corresponding electrical load associated with the modular components, a new determination of the level of power supply redundancy is made. If a desired level of power supply redundancy is not achieved, additional power supply can be added to the computer system to achieve the desired level of power supply redundancy.

The level of the power supply redundancy provides, e.g., an accurate indication of whether the computer system can remain operable if one or more modular power supply components fails or is disconnected from the computer system. The determined level of power supply redundancy further provides an accurate indication of whether a desired level of power supply redundancy is maintained, or achieved, when the computer system is reconfigured.

2. Description of Related Art

Networks serve the purpose of connecting many different personal computers (PCS), workstations, or terminals to each other, and to one or more host computers, printers, file servers, etc., so that expensive computing assets, programs, files and other data may be shared among many users.

In a network utilizing a client/server architecture, the client (personal computer or workstation) is the requesting machine and the server is the supplying machine, both of which may preferably be connected via the network, such as a local area network (LAN), wide area network (WAN) or metropolitan area network (MAN). This is in contrast to early network systems that utilized a mainframe with dedicated terminals.

In a client/server network, the client typically contains a user interface and may perform some or all of the application processing and, as mentioned above, can include personal computers or workstations. The server in a client/server network can be a high-speed microcomputer or minicomputer and in the case of a high-end server can include multiple processors and mass data storage devices such as multiple CD-ROM drives and multiple hard drives, preferably with "redundant array of inexpensive disk" (RAID) protection. An exemplary server, such as a database server, maintains the databases and processes requests from the client to extract data from or to update the database. An application server provides additional business processing for the clients. The network operating system (NOS) together with the database management system (DBMS) and transaction monitor (TP monitor) are responsible for the integrity and security of the server.

Client/server networks are widely used throughout many different industries and business organizations, especially where mission-critical applications requiring high performance are routinely launched. The mass storage and multi-processing capabilities provided by current client/server network systems (for example, the high-end servers) that run such applications permit a wide range of essential services and functions to be provided through their use.

As can be appreciated, many businesses are highly dependent upon the availability of their client/server network systems to permit essential network services and functions to be carried out. As client/server network systems become increasingly essential to the everyday operations of such businesses, additional steps need to be taken in the design and construction of the server in the client/server network system to ensure its continuous availability to the clients. That is to say, in the design and construction of a server, steps need to be taken to ensure that the server can be operated with little or no downtime.

It can be appreciated by those skilled in the art that high availability, reliability and serviceability are valuable design aspects in ensuring that a server is a "zero downtime" system that will operate with little or no downtime. The modularity of components within a server has been recognized as an important design consideration in ensuring that the downtime of a server will be minimized. Modules can be removed and examined for operability or other purposes much easier than permanently mounted fixtures within a server chassis. When various components of a server can be provided in a modular form, they can also be readily replaced to maintain the operational status of the server with minimal downtime.

Removable modular components may include disc drives and power supplies. As described above, the removability of modular components allows for better overall serviceability of the computer system which is a distinct advantage. For example, a defective power supply in the server generally requires prompt replacement in order to limit downtime. Modular components and connectors facilitate prompt replacement and are thus popular in many computer designs.

Originally, a rule of practice in the maintenance of modular components or printed circuit boards of a server was that of turning the power to the server off before any modular components or printed circuit boards were removed from or added to the chassis or support frame of the server. Recent innovations have centered around a highly desirable design goal of "hot-pluggability" which addresses the benefits derived from inserting and removing modular components and printed cards from the chassis of the server when the server is electrically connected and operational. It can be readily appreciated that modularization and hot-pluggability can have a significant bearing on the high availability aspect of a high-end server.

Hot-pluggable components may include storage or disc drives, drive cages, fans, power supplies, system I/O boards, control boards, processor boards, and other sub-assemblies. The ability to remove these constituent components without having to power down the server allows for better overall serviceability of the system, which is a distinct advantage to both the user and the maintenance technician.

Component redundancy has also been recognized as an important design consideration in ensuring that a server will operate with little or no downtime. Essentially, component redundancy is typically provided in a system to better ensure that at least one of the redundant components is operable, thereby minimizing the system downtime. With component redundancy, at least two components are provided that can perform the same function, such that if one of the components becomes faulty for some reason, the operation fails over to the redundant component. When at least one of the redundancy components is operable, continued operation of the computer system is possible even if others of the redundant components fail. To further enhance reliability and serviceability, redundant components have been made hot-pluggable.

Dynamic reconfiguration of a server system can also be accomplished by providing upgradeable modular components therein. As can be readily appreciated, this objective can be accomplished by the addition or substitution of components having different circuits, preferably updated or upgraded, disposed therewithin. When components are redundant and hot-pluggable, reconfiguration of the server is often possible without taking the server offline.

Another important design aspect with respect to providing redundant and hot-pluggable components in a server system is to ensure and maintain a safe working environment while the server is operating and being repaired or upgraded. Accordingly, when the system components are swapped or upgraded, the exposure of hot connectors and contacts must be kept to a minimum. It can be appreciated by those skilled in the art that further developments in this area would significantly enhance the reliability and serviceability aspects of a high-end server system.

To further enhance the serviceability of server systems, additional innovations may be required in the design and construction of diagnostic sub-systems thereof. In existing client/server network systems it is often difficult to obtain in a timely manner important diagnostic data and information corresponding to a component failure in order to facilitate the quick serviceability of the server. Therefore, it can be appreciated that the more information that can be readily provided to locate a defective component or problem with the server, the better is the optimization of the amount of time the server is up and running.

The ability to dynamically reconfigure a server system, or other computer system, advantageously facilitates ease of addition or substitution of components of the system. But, such alteration might well alter the electrical load of the modular load components.

When a server, or other computer, system is initially configured, the system typically is constructed to include redundant power supplies to power the electrical load of the modular load components. In the initial configuration of the system, at least complete redundancy of the power supply is formed. In the event of failure of one modular power supply component, at least one other modular power supply component remains to permit continued operation of the system.

If the electrical load which must be powered by the initially-redundant power supply increases, the power supply might well not remain wholly redundant. If one of the modular power supply components fails, or is otherwise unable to provide operative power, the remaining modular power system components would be unable adequately to power the load components of the computer system. And, without adequate powering, the computer system would become inoperable.

Therefore, consideration must be given to the effect on the change in power requirements that reconfiguration of the load components of the computer system might cause. When the computer system is reconfigured during on-line operation, the power requirements of the reconfigured system might be particularly likely to be inadequately considered. Or, only a qualitative judgment might be made of the level of the power capacity relative to the load which must be powered to operate the system.

A manner by which to determine the level of redundancy of the computer system while the system is online would be advantageous. A dynamically-determined level would provide an accurate indication of the level of the redundancy of the computer system as actually configured.

It is in light of this background information related to power requirements of computer systems that the significant improvements of the present invention have evolved.

SUMMARY OF THE INVENTION

The present invention, accordingly, advantageously provides apparatus, and an associated method, for determining the power supply redundancy level of a set of modular power supplies which form a portion of a computer system, such as a server system.

Determinations of the power supply redundancy level are made dynamically. Such determinations can be made, for instance, during on-line operation of the computer system. If the computer system is reconfigured in a manner which increases the level of electrical loading which must be powered by the system power supply, a new determination of the power supply redundancy level is made. An accurate indication of the level of redundancy is provided of the power requirements of the computer system, as reconfigured. If a desired level of power supply redundancy is not achieved, additional power supply can be added to the computer system.

Use of an embodiment of the present invention is particularly amenable in a modular computer system which might be reconfigured to update, or otherwise improve, the system. As additional load components are added to the computer system, automatic redetermination of the level of power supply redundancy is selectively performed. The maintenance of an adequate level of power supply redundancy to power the load components of the computer system can be based upon quantitative determinations rather than qualitative judgments or guesswork.

In another aspect of the present invention, a new determination of the power supply redundancy level is made when a modular power supply component is removed, or added, to the computer system. A new determination is similarly also made if the power capacity of the modular power supply components is otherwise altered. If a desired level of redundancy is not maintained, or achieved, appropriate corrective action can be taken.

In these and other aspects, therefore, apparatus, and an associated method, determines a power supply redundancy level of a computer system. The computer system includes a set of load elements powered by a set of power supplies. Each power supply of the set of power supplies is selectively coupled to an external power source. Each load element of the set of load elements and each power supply of the set of power supplies is releasably connected to form a portion of the computer system to permit on-line reconfiguration of the computer system. A power supply characteristic detector is coupled to receive indications of characteristics associated with each of the power supplies of the set of power supplies. A redundancy determiner is coupled to the power supply characteristic detector. The redundancy determiner is selectively operable to determine values representative of power capacity levels of the set of power supplies relative to load levels exhibited by the set of load elements. The values determined thereby form the power supply redundancy level.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
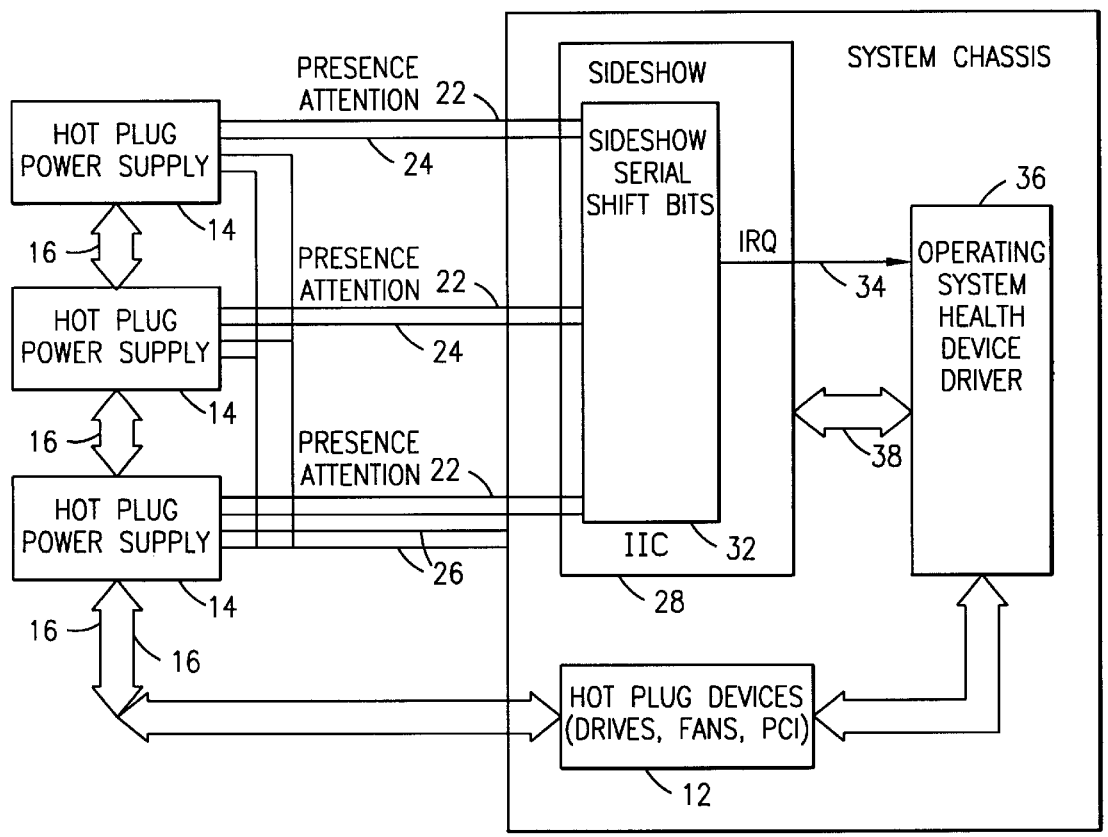
FIG. 1 illustrates a functional block diagram of a computer system in which an embodiment of the present invention is operable.

Referring first to FIG. 1, a computer system, shown generally at 10, includes a plurality of load components 12 and a plurality of modular power supply components 14. For purposes of simplicity, the modular load components 12 are illustrated as a single block. Such single block is, however, representative of any number of modular components which can be plugged, or otherwise placed, in electrical connection to form a portion of the computer system 10. Such load components include, for example, a disc drive, a coolant fan, a PCI (peripheral component interconnect/interface) device, or other component which requires electrical power for its operation. In the exemplary embodiment, the modular load components 12 are each hot-pluggable, that is to say, each of the load components 12 is removable and replaceable during operation of the computer system 10.

The load components 12 are powered by the power supply components 14. The power supply components 14 are coupled to the load components 12 by way of the power lines 16. In the exemplary embodiment, separate lines upon which 3 V, 5 V, and 12 V, respectively, direct current voltages are provided. The load components 12 are coupled to appropriate ones of the lines 16 to receive operating power to permit operation of the load components. Each of the power supply components 14 is, in turn, in conventional manner, coupled to an external power source, such as a 110 V alternating current, or 220 V external power source. In the exemplary embodiment, the power supply components 14 also form hot-pluggable components which can be added or removed into and out of connection with the computer system 10 to form a portion thereof.

The modular power supply components 14 together form a heterogeneous power supply having power characteristics formed of the combination of the power supply components 14. In conventional manner, the power capacities of the individual ones of the power supply components 14 are, in part, dependent upon the external power source to which such power supply components 14 are coupled. In one embodiment, when the power supply component 14 is coupled to a 110 V alternating-current power source, the power capacity of a single power supply component 14 differs from the corresponding power capacity of the same power supply component 14 when, instead, the power supply component 14 is coupled to a 220 V external power source.

Each of the power supply components 14 is coupled to a line 22 forming a presence-indicator line and each of the power supply components 14 is also coupled to an attention indicator line 24. The presence and attention indicator lines, in turn, are coupled to an ASIC (application specific integrated circuit) 28. Signals generated by individual ones of the power supply components 14 on respective ones of the lines 22 and 24 form inputs to the logic circuitry of the ASIC 28. In the exemplary embodiment, the lines 22 and 24 are coupled to circuitry forming a serial shift bit circuit 32 of the ASIC.

Each of the power supply components 14 is further coupled, by way of an IIC (inter-integrated circuit) bus with the ASIC 28 to be coupled to other logical circuitry (not separately shown) of the ASIC. Two-way communication is permitted with firmware (not separately shown in the figure) forming portions of each of the power supply components 14.

Responsive to detection of signals (here a change in value) generated on any of the lines 22 or 24, an interrupt 34 is generated and provided to a device driver 36. In an exemplary embodiment, the interrupt 34 is generated on an APIC (advanced programmable interrupt controller) bus. Detection of the interrupt 34 by the device driver 36 prompts an algorithm to be executed by the driver 36 at least to initiate determination of the redundancy power level of the computer system 10.

The ASIC 28 is further coupled to the device driver 36 to permit two-way communication therebetween, here represented by the lines 38. In one embodiment, the lines 38 are representative of a PCI (peripheral component interconnect/interface) bus, a PCI bridge, and also a processor bus. Data and commands generated by the device driver 36 can thereby be communicated by the way of the lines 38, the ASIC 28, and the IIC bus 26 to the power supply components 14 and data generated by the firmware of the power supply components 14 can analogously be communicated to the device driver 36 in reverse manner.

In one embodiment, responsive to reception of an interrupt 34, the device driver 36 generates commands to a selected one or more of the power supply components 14. The commands include requests for information related to the appropriate power supply component. Responses to such commands are returned to the device driver 36 whereat determinations of the value of the power level redundancy are made. To determine the power level redundancy, a ratio of the combined power capacity of the power supply components 14 relative to the load requirements of the load components 12 is determined. A ratio of value two would be indicative of entire redundancy.

In one embodiment of the present invention, the power load of the load components 12 which are powered by the power supply components 14 is calculated in the determination of the level of power supply redundancy. The firmware of the power supply components 14 is formed such that an attention signal is generated on an attention line 24 when the load powered by the power supply changes more than a selected amount beyond a previously-measured level. Responsive to the generation of such an attention signal, redetermination of the level of power supply redundancy is made. Thereby, if additional load devices 12 are added to the computer system 10 or if the power consumption of the load components 12 increases during periods of heavy operation, redeterminations of the level of power supply redundancy are made, thereby to provide a dynamic indication of the actual level of power supply redundancy.

When there is a change in the presence of a power supply component 14 on any of the presence lines 22, an interrupt 34 is generated, also to cause a redetermination of the level of power supply redundancy by the device driver 36. When, for instance, a power supply component 14 is taken out of connection with the computer system 10, such removal causes a change in the value of the signal generated on the presence indicator line 22 and causes the generation of an interrupt 34. A redetermination of the level of power supply redundancy is made as a result of the reduction of power capacity of the combined power supply components 14. Analogously, when an additional power supply component 14 is connected to form a portion of the computer system 10, a change in value of a present signal on an appropriate one of the lines 22 results in the generation of an interrupt 34. Again, a redetermination of the level of power supply redundancy is made.

Because determinations of the level of power supply redundancy are made dynamically, an accurate, and up-to-date determination of the level of power supply redundancy is made. As the power supply or load characteristics of the computer system 10 change, redetermination of the level of power supply redundancy of the computer system, as reconfigured, is made.

Figure 2:
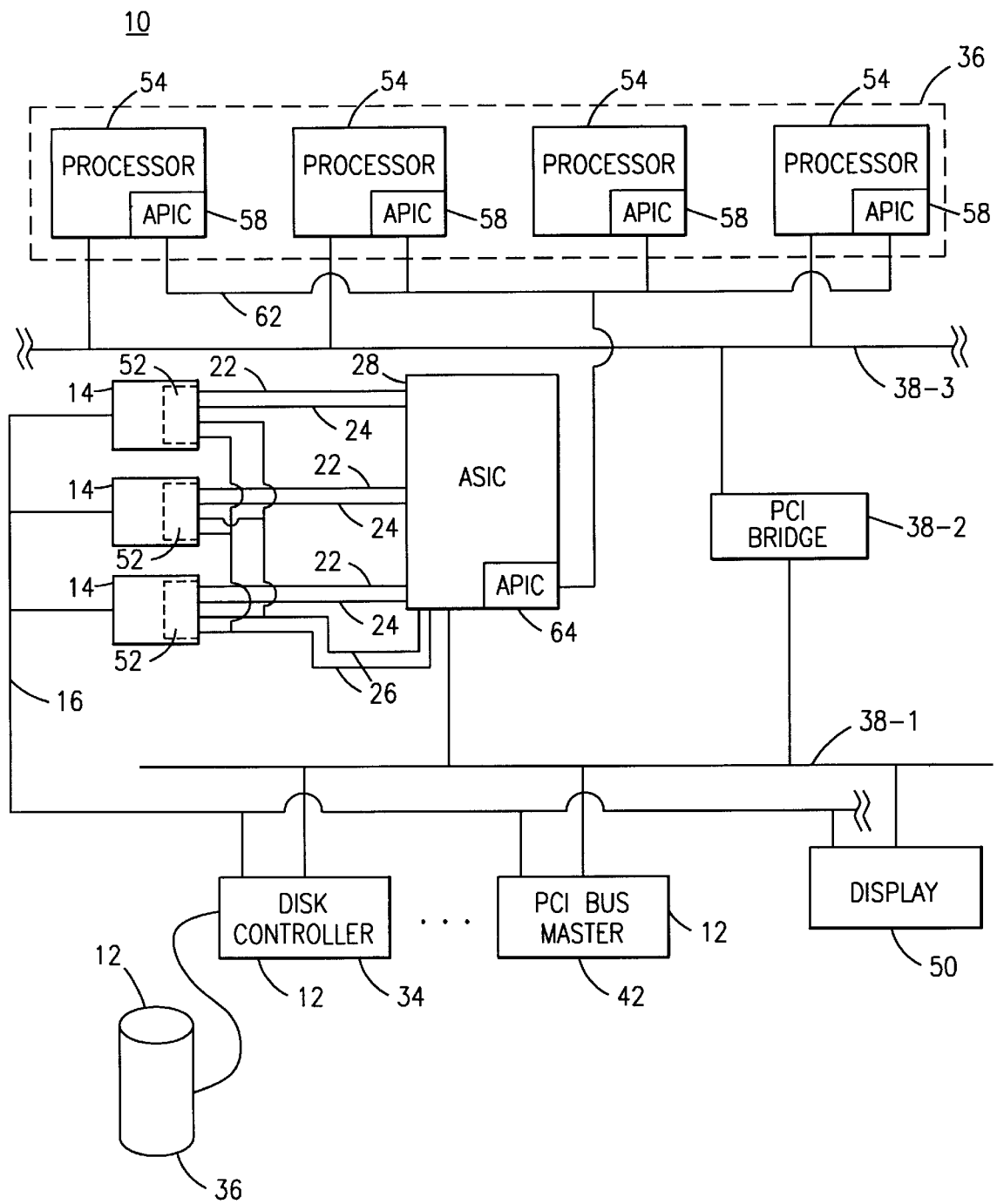
FIG. 2 illustrates a functional block diagram, similar to that shown in FIG. 1, but here showing a specific implementation of the computer system.

FIG. 2 illustrates the computer system 10, here again shown to include modular load components 12 and modular power supply components 14. The load components here are illustrated to include a disc drive and associated controller and a PCI bus master. The load components 12 are again shown to be coupled to the power supply components 14 by way of the lines 16 to receive operable power therefrom.

Firmware 52 is associated with each of the power supply components 14, and each of the power supply components 14 is again shown to be coupled to the ASIC 28 by way of the presence indicator and attention lines 22 and 24, respectively. Furthermore, the IIC lines 26 are again shown to interconnect the power supply components 14 and the ASIC 28.

The computer system 10 is here shown to be a multiprocessor system including a plurality of processors 54. One or more of the processors executes an algorithm to determine the level of power supply redundancy. The device driver 36 is shown in the FIG. to encompass all of the processors 54 to indicate that the algorithm is executed by any one or more of the processors 54.

The lines 38 connecting the ASIC 28 with the device driver 36 are here shown to be formed of a PCI bus 38-1, a PCI bridge 38-2, and a processor bus 38-3.

The computer system 10 is further shown to include a plurality of local APICs (advanced programmable interrupt controllers) 58 associated with each of the processors 54. The local APICs 58 are interconnected by way of an APIC bus 62. An I/O (input/output) APIC 64, associated with the ASIC 28, is also coupled to the APIC bus 62. Interrupt messages, such as the interrupt 34 shown in FIG. 1, can be generated by the APIC 64 and transmitted upon the APIC bus 62 to an appropriate one of the local APICs 58. When a signal is generated upon any one of the presence or attention indicator lines 22 or 24, an interrupt message is generated by the APIC 64 upon the APIC bus 62 to an APIC 58 associated with a processor 54 forming the device driver operable to execute the algorithm which determines the level of power supply redundancy.

Responsive to reception of the interrupt message, signals are generated by the appropriate processor 54 for transmission upon the processor bus 38-3, the PCI bridge 38-2, and the PCI bus 38-1, to the ASIC 28, and upon the IIC bus 26 to the appropriate power supply component 14. Communication between the power supply component 14 and the processor 54, provides the processor 54 with the appropriate data to determine the level of power supply redundancy.

Thereby, a dynamic, and up-to-date, determination of the level of power supply redundancy is made. Display of the determined level is displayable, for instance, upon the LCD display 50.

Figures 3, 4:
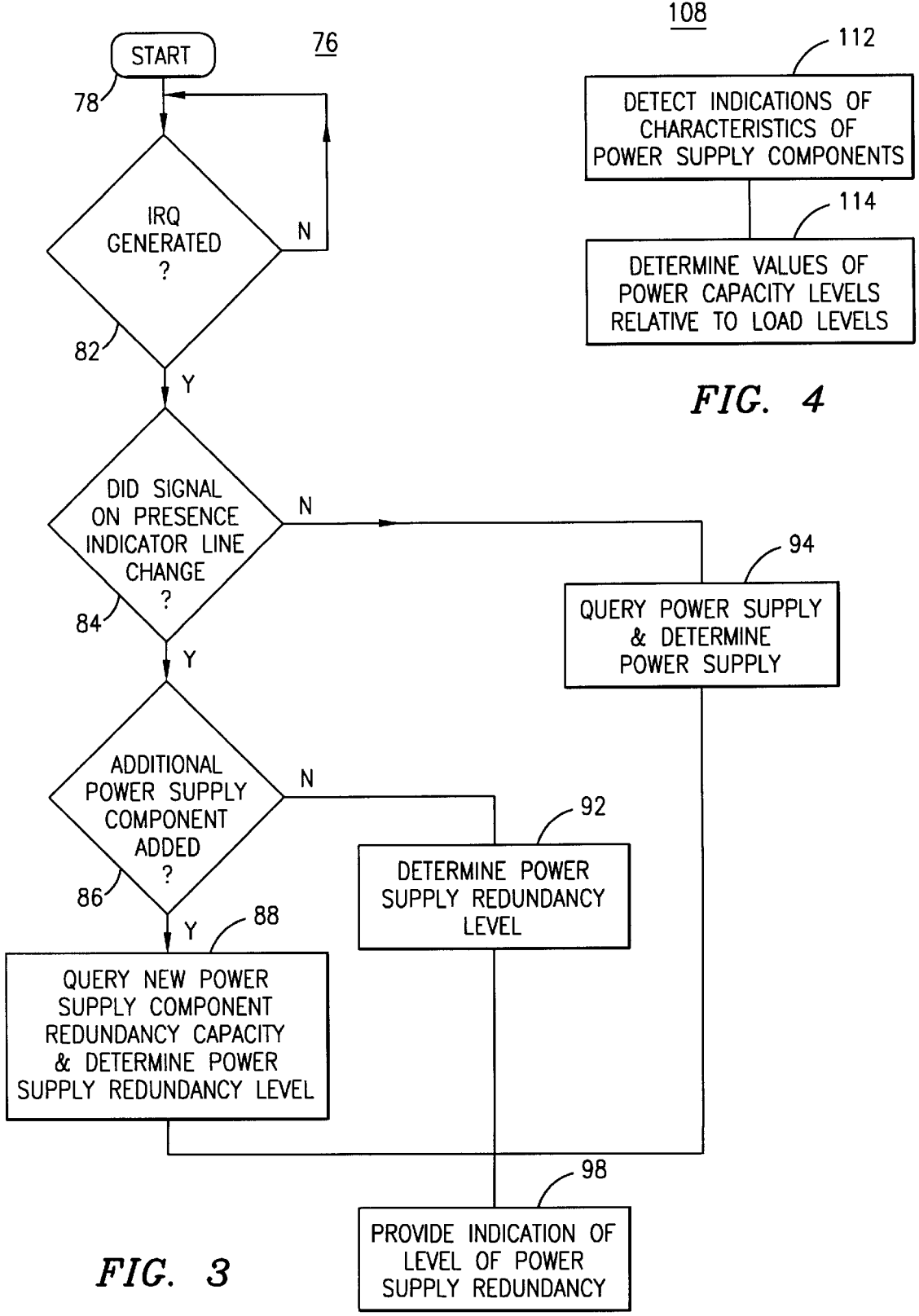
FIG. 3 illustrates an algorithm showing the process by which the level of power supply redundancy is calculated during operation of an embodiment of the present invention.
FIG. 4 illustrates a method flow diagram listing the method steps of the method of an embodiment of the present invention.

FIG. 3 illustrates a method, shown generally at 76, of operation of the device driver 36 which forms a portion of an embodiment of the present invention. After entry into the algorithm, as indicated by the start block 78, a determination is made at the decision block 82 as to whether an interrupt (IRQ) has been generated. If not, the no branch is taken back to the decision block 82. Otherwise, the yes branch is taken to the decision block 84.

At the decision block 84, a determination is made as to whether the interrupt was generated as a result of a change in the signal value of the signal generated on a presence indicator line. If so, the yes branch is taken to the decision block 86 whereat a determination is made as to whether an additional power supply component has been added to the computer system. If so, the yes branch is taken to the block 88 whereat the new power supply component is queried by way of an IIC bus regarding the power capacity of the power supply component and the level of power supply redundancy is determined. If the no branch is taken from the decision block 86, a power supply component has been removed out of connection with the computer system. Redetermination of the level of power supply redundancy is again determined, as indicated by the block 92.

If the no branch is taken from the decision block 84, a change in the value of a signal generated upon one or more of the attention indicator lines is the cause of the generated interrupt. The no branch is taken to the block 94 whereat the power supply is queried regarding a characteristic of the power supply component. As described previously, two-way communication between the power supply components and the device driver causes a change in the signal value of a signal generated by the firmware of a power supply component responsive to some desired system condition. Data provided to the device driver responsive to such communications or responsive to the interrupt permits a determination of the level of power supply redundancy to be made. Thereafter, and as indicated by the block 98, an indication at least of an inadequate level of power supply redundancy can be provided to permit a user of the computer system to make corrective actions.

FIG. 4 illustrates a method, shown generally at 108, of an embodiment of the present invention. The method 108 determines a power supply redundancy level of a computer system having modular load components powered by modular power supply components. First, and as indicated by the block 112, indications of characteristics associated with each of the power supplies of the set of power supplies are detected. Then, and as indicated by the block 114, values representative of power capacity levels of the power supply components relative to load levels exhibited by the load components are selectively determined. Such determinations form the power supply redundancy level. If the power supply redundancy level is less than a selected threshold, an indication is provided to a user of the computer system.

Thereby, through operation of an embodiment of the present invention, a dynamic determination of the level of power supply redundancy of a computer system is dynamically made. The determination is made during online operation of the computer system. If reconfiguration of the computer system results in an increase in the load which must be powered by a power supply to reduce the level of redundancy below a desired threshold, an indication is provided to a user of the computer system so that corrective action can be taken.

The previous descriptions are of preferred examples for implementing the invention, and the scope of the invention should not necessarily be limited by this description. The scope of the present invention is defined by the following claims.

What is claimed is:

1. In a computer system having a set of load elements powered by a set of power supplies, each power supply of the set of power supplies selectively coupled to an external power source, each load element of the set of load elements and each power supply releasably connectable to the computer system to permit on-line reconfiguration of the computer system, an improvement of apparatus for determining a power supply redundancy level while the computer system is on-line, said apparatus comprising:

a power supply characteristic detector coupled to receive indications of characteristics associated with each power supply of the set of power supplies; and a redundancy determiner coupled to said power supply characteristic detector, said redundancy determiner selectively operable for determining values representative of power capacity levels of the set of power supplies relative to load levels exhibited by the set of load elements, the values determined thereby forming the power supply redundancy level;

wherein said redundancy determiner determines the values representative of the power capacity levels relative to the load levels responsive to one of reception at said power supply characteristic detector of an indication of a change in power capacity of any power supply of the set of power supplies and detection by said power supply characteristic detector of an incremental increase in the load levels.

2. The apparatus of claim 1 wherein the characteristics associated with each of the power supplies of which the indications thereof are received by said power supply characteristic detector comprise power capacities of each of the power supplies.

3. The apparatus of claim 2 wherein each power supply of the set of power supplies is selectively coupled to an external power source and wherein the power capacities of each power supply is dependent upon characteristics of the external power source coupled thereto.

4. The apparatus of claim 1 wherein the external power source to which each power supply is selectively coupled comprises, at least alternately, a first external power source of first characteristics and a second external power source of second characteristics, wherein the power capacity of each power supply is alternately of a first power capacity and a second power capacity dependent upon which of the first and second external power sources, respectively, to which the power supply is coupled, and wherein said redundancy determiner is operable each time in which coupling of any power supply to any of the external sources is altered.

5. The apparatus of claim 1 wherein the characteristics associated with each of the power supplies of which the indications thereof are received by said power supply characteristic detector comprise power capacities of each of the power supplies load levels powered by the power supplies of the set of power supplies.

6. The apparatus of claim 1 wherein the characteristics associated with each of the power supplies of which the indications thereof are received by said power supply characteristic detector comprise electrical connection of the power supplies to form a portion of the computer system.

7. The apparatus of claim 6 wherein said redundancy determiner is operable responsive to detection by said power supply characteristic detector of a change in the electrical connection of any of the power supplies.

8. The apparatus of claim 7 wherein the change in the electrical connection comprises addition of an additional power supply to form a portion of the computer system.

9. The apparatus of claim 7 wherein the change in the electrical connection comprises disconnection out of the electrical connection of a power supply of the set of power supplies.

10. The apparatus of claim 1 wherein the computer system further comprises an interrupt bus connected between said power supply characteristic detector and said redundancy determiner and wherein said power supply characteristic detector causes generation of an interrupt on the interrupt bus when an indication of a characteristic associated with at least one power supply of the set of power supplies is of a selected value.

11. The apparatus of claim 10 wherein redundancy determiner is operable responsive to detection thereat of the interrupt generated by said power supply characteristic detector.

12. The apparatus of claim 1 wherein said computer system further comprises an inter-integrated circuit bus, wherein each power supply of said set of power supplies, when connected to form a portion of the computer system, is coupled to the inter-integrated circuit bus, and wherein indications of at least selected characteristics of the set of power supplies are provided to said power supply characteristic detector by way of the inter-integrated circuit bus.

13. The apparatus of claim 1 wherein said redundancy determiner further generates a redundancy-level signal at least to identify when the power supply redundancy level determined thereat is of a level representative of at least a wholly redundant power capacity relative to the load levels exhibited by the set of load elements.

14. The apparatus of claim 1 wherein said redundancy determiner is further operable to generate values representative of simulated power capacity levels relative to simulated load levels to form a simulated power supply redundancy level to determine the power supply redundancy level of the computer system under simulated conditions.

15. A method for determining a power supply redundancy level of a computer system having a set of load elements powered by a set of power supplies, each load element of the set of load elements and each power supply removably connectable to the computer system to permit on-line reconfiguration of the computer system, said method comprising the steps of:

detecting indications of characteristics associated with each of the power supplies of the set of power supplies;

receiving an interrupt indicating a change in power capacity levels of the set of power supplies, a change in the load levels or removal of one of the rest of the power supplies; and responsive to the received interrupt, determining values representative of power capacity levels of the set of power supplies relative to load levels exhibited by the set of load elements during on-line operation of the computer system, the values determined thereby forming the power supply redundancy level.

16. The method of claim 15 comprising the further step of redundancy-level signal at least to identify when the power supply redundancy level determined during said step of determining is of a level representative of at least a wholly redundant power capacity relative to the load levels exhibited by the set of load elements.

17. The method of claim 15 wherein the indications of the characteristics detected during said step of detecting comprise indications of power capacities of each of the power supplies.

18. The method of claim 15 wherein the indications of the characteristics detected during said step of detecting comprise load levels of the set of load elements powered by the power supplies of the set of power supplies.

* * * * *